L. Pusey,
Machine Brake.
Nº 20,368.  Patented May 25, 1858.
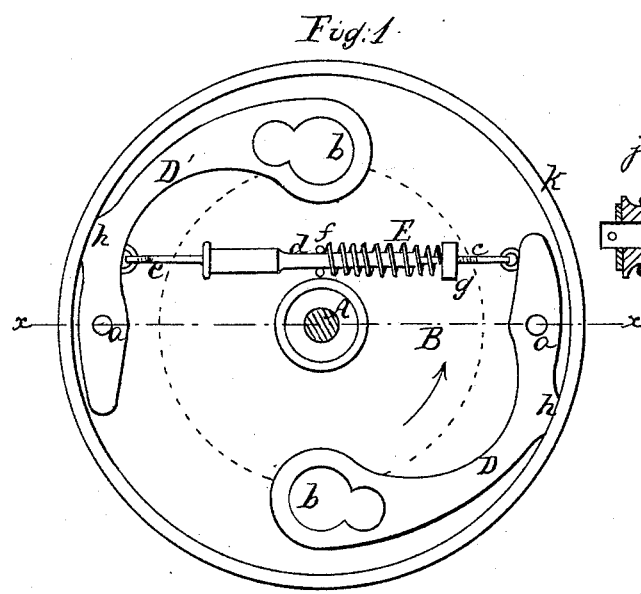
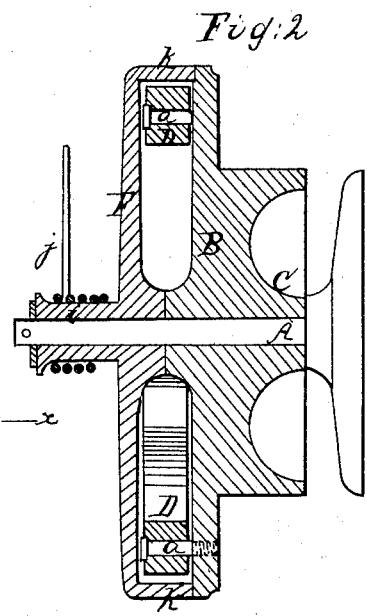
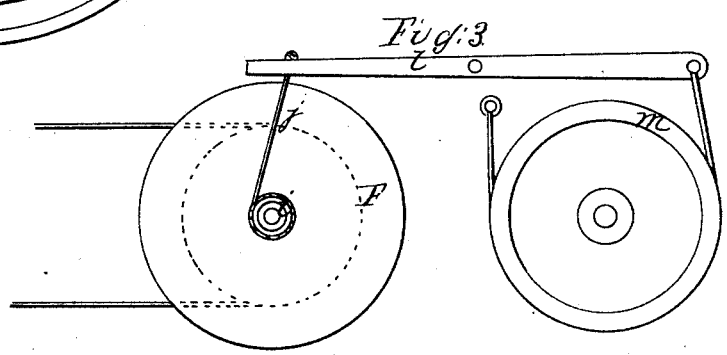

UNITED STATES PATENT OFFICE.

L. PUSEY, OF WILMINGTON, DELAWARE.

GOVERNOR FOR HORSE-POWER.

Specification of Letters Patent No. 20,368, dated May 25, 1858.

*To all whom it may concern:*

Be it known that I, LEA PUSEY, of Wilmington, in the county of Newcastle and State of Delaware, have invented a new and Improved Governor Designed Chiefly for Horse-Powers; and I do hereby declare that the following is a full, clear, and exact description of the same, reference being had to the annexed drawings, making a part of this specification, in which—

Figure 1, is a face view of the disk to which the levers and brakes are attached. Fig. 2, is a central section of the device taken in the line $x, x$, Fig. 1. Fig. 3, is a view showing one means whereby the device is made to regulate the movement of the machine to which it is applied.

Similar letters of reference indicate corresponding parts in the several figures.

This invention consists in the employment or use of loaded levers or sliding weights, provided with brakes and connected by a rod and regulating spring, said loaded levers or sliding weights being attached to a rotary arm or plate or to the fly wheel of the machine and used in connection with a stationary or revolving friction rim, whereby the speed of the horse power or other machine to which the governor is applied may be regulated as desired and by a very simple and economical arrangement of means.

To enable those skilled in the art to fully understand and construct my invention I will proceed to describe it A, represents a shaft on which a disk B, is placed loosely, said disk being provided at one side with a pulley C, attached permanently to it. To the opposite side of the disk two levers D, D', are attached by fulcrum pins $a, a$, the levers being loaded at one end as shown at $b, b$. To the end of the lever D, opposite to that where its weight $b$, is attached a rod $c$, is connected. This rod screws into a socket $d$, which is attached to a rod $e$, said rod $e$, being connected to the lever D', between its fulcrum pin $a$, and its weight $b$.

E, is a spiral spring which is placed around the socket $d$, one end of said spring bearing against pins $f, f$, which are attached to the disk B, and the other end bearing against a button or stop $g$, which is a nut fitted on the rod $c$. To each lever D, D', a brake $h$, is attached, and it will be seen by referring to Fig. 1, that the spring E, has a tendency to keep the brakes or the loaded ends of the levers from distending.

F, is a disk which is also placed loosely on the shaft A, said disk having a pulley $i$, at its outer side to which a cord or belt $j$, is attached. The periphery of the disk F, has a flanch or rim $k$, projecting from it at right angles and inclosing the levers D, D', on disk B, see Fig. 2.

The cord or belt $j$, may be attached to a brake lever $l$, which may act upon the fly wheel $m$, of the machine to which the governor is applied, see Fig. 3.

From the above description of parts it will be seen that if a belt from the machine to be driven be placed around the pulley C, and the disk B, rotated, the levers D, D', will, when a certain speed of disk F, is obtained to overcome the spring E, be thrown outward by centrifugal force and the brakes $h, h$, will press sufficiently hard against the rim $k$, to cause the same to rotate and the cord $j$, being wound on the pulley $i$, will actuate the brake lever $l$, and sufficient friction will be applied to the fly wheel to check the speed of the machine. It will be seen that by regulating the tension of spring E, which may be done by adjusting nut $g'$ the speed of the machine to which the governor is applied may be regulated as desired, for if the spring be stiff the speed of the disk B, must be correspondently greater in order that the centrifugal force generated by its rotation will be sufficiently powerful to overcome the spring and throw out the brakes $h$.

There are various ways that may be devised for transmitting the power from the pulley $i$, to the fly wheel of the machine, and various means may be devised for applying the levers and spring to the machine, for instance, the rim $k$, may be stationary and the levers D, D', with their concomitant parts may be directly attached to the fly wheel or to arms attached to the fly wheel shaft. This would be a very direct application of the device, and would probably be desirable in some cases, when machines are built for its express application. The arrangement as described and shown in the drawings renders however the governor complete in itself and capable of being applied to a horse power or any other machine for the throttle valve of an engine or the gate of a water wheel may be actuated from pulley $i$, by various simple means.

I do not confine myself to any particular application of the levers D, D′, and spring E, nor do I confine myself to levers D, D′, for their equivalents may be used, for instance, the brakes $h$, may be attached to weights placed on a rod or guide, the weights being connected by a spring and lever. This however is precisely the same as the levers in principle.

Having thus described my invention what I claim as new and desire to secure by Letters Patent, is,

The loaded levers D, D′, or sliding weights, provided with brakes $h$, connected by a spring and rods, and attached to an independent rotating disk, or rotating arms, or to the fly wheel of the machine to which the device is applied in combination with a stationary or revolving rim $k$, the whole being arranged to operate as and for the purpose set forth.

LEA PUSEY.

Witnesses:
  ESTRANGE GOULD,
  EDW PUSEY.